United States Patent [19]
Yamagata

[11] Patent Number: 5,126,896
[45] Date of Patent: Jun. 30, 1992

[54] RECORDING OR REPRODUCING APPARATUS HAVING A HEAD POSITIONING, MOTOR POWER CONTROL CIRCUIT

[75] Inventor: Shigeo Yamagata, Kanagawa, Japan

[73] Assignee: Canon Kabushiki Kaisha, Tokyo, Japan

[21] Appl. No.: 432,055

[22] Filed: Nov. 6, 1989

[30] Foreign Application Priority Data

Nov. 11, 1988 [JP] Japan ................. 63-285143

[51] Int. Cl.$^5$ .................................... G11B 5/596
[52] U.S. Cl. .................... 360/78.04; 360/78.13
[58] Field of Search ............. 360/75, 78.04, 78.13

[56] References Cited

U.S. PATENT DOCUMENTS

| | | | |
|---|---|---|---|
| 4,635,145 | 1/1987 | Horie | 360/78.04 |
| 4,737,867 | 4/1988 | Ishikawa | 360/75 X |
| 4,782,406 | 11/1988 | Shoji | 360/75 X |
| 4,783,706 | 11/1988 | Shoji | 360/75 X |

*Primary Examiner*—A. J. Heinz
*Attorney, Agent, or Firm*—Robin, Blecker, Daley & Driscoll

[57] ABSTRACT

An apparatus for recording or reproducing signals by allowing a head to gain access to a recording track on a recording medium comprises a tracking device arranged to drive the head with a motor to set the head at the recording track in a position where a recorded signal can be reproduced at a maximum level, a determining circuit arranged to determine the excited state of the motor obtained after completion of the tracking action of the tracking device, and a control circuit for controlling a power supply to the motor according to the result of determination made by the determining circuit.

34 Claims, 5 Drawing Sheets

RECORDING OR REPRODUCING APPARATUS HAVING A HEAD POSITIONING, MOTOR POWER CONTROL CIRCUIT

BACKGROUND OF THE INVENTION

1. Field of the Invention

This invention relates to a recording or reproducing apparatus and more particularly to a head driving control device of the recording or reproducing apparatus.

2. Description of the Related Art

The conventional recording or reproducing apparatuses include an apparatus of the kind arranged to record or reproduce information in or from a track selected from among a plurality of concentric circular tracks formed on a disc-shaped recording medium, such as a magnetic disc, by allowing a magnetic head to gain access to the tracks.

In reproducing recorded information from a track designated, the apparatus of this kind moves the magnetic head to the designated track and performs a so-called automatic tracking action to control the position of the magnetic head in such a way as to keep the head in a position where an RF signal can be reproduced from the track at a maximum level. After that, the head is controlled to continuously perform reproduction in this head position so long as no instruction is given for a change of the designated track for another.

Generally, a stepper motor is employed as a drive source for moving the magnetic head. The stepper motor is arranged to shift the position of the magnetic head toward the inner or outer circumferential side of the magnetic disc in response to a driving pulse applied. The stepper motor is of a type called a 4-phase stepper motor having four exciting phases. As to the driving method, the stepper motor is driven by a 1-2 exciting phase change-over method. The magnetic head is moved to a desired position in accordance with the rotation of the stepper motor. The head tracking arrangement has been disclosed, for example, in U.S. Pat. Nos. No. 4,799,205 and No. 4,573,087 and U.S. patent application Ser. No. 051,479 filed on May 18, 1987.

However, in accordance with the driving method of the above-stated apparatus, the stepper motor is continuously excited by a power supply for one and the same phase even while the magnetic head is not moved, that is, even after the magnetic head is set by the automatic tracking action in a position where the RF signal can be reproduced at a maximum level. In other words, the stepper motor is continuously excited under that condition even though the power supply is effected only for one stable exciting phase. This increases the power consumption of the apparatus. In a case where a battery is used as a power source, this presents a serious problem.

SUMMARY OF THE INVENTION

This invention is directed to the solution of the above-stated problem of the prior art. It is therefore a first object of the invention to provide a recording or reproducing apparatus which is capable of efficiently supplying electric energy to a motor used for driving a magnetic head thereof.

It is a second object of the invention to provide a motor control device which is capable of enhancing electric energy efficiency for reduced power consumption by controlling the state of power supply according to the excited state of the motor under control.

It is a third object of the invention to provide a head tracking device which is arranged to perform a tracking action for accurately positioning a head relative to a recording track and to optimize a power supply to a motor according to the excited state of the motor after completion of the tracking action.

Under these objects, a recording or reproducing apparatus arranged as a preferred embodiment of the invention to perform recording or reproduction by allowing a head to gain access to a recording track on a recording medium comprises: tracking means arranged to drive and shift the head with a motor to a position where a recorded signal can be reproduced from the track at a maximum level; determining means for determining the excited state of the motor obtained after completion of a tracking action of the tracking means; and control means for controlling a power supply to the motor according to the result of determination made by the determining means.

The above-stated arrangement enables the embodiment not only to accurately position the head relative to the recording track but also to accomplish the head positioning action with a reduced amount of power consumption.

Further, under these objects, a motor control device which is arranged as a preferred embodiment of the invention to position a movable body as desired comprises: a motor which drives the movable body to move to a desired position; first control means arranged to detect a deviating degree of the position of the movable body from the desired position and to control the motor in such a manner as to minimize the deviating degree of the position of the movable body; and second control means arranged to control a power supply to the motor according to the excited state of the motor after completion of the positioning action on the movable body.

The arrangement enables the positioning action on the movable body to be efficiently accomplished.

A head tracking device arranged, as another preferred embodiment of the invention, to position a head relative to a recording track comprises: a stepper motor arranged to drive and move the head; motor control means for controlling the stepper motor to position the head relative to the recording track in such a way as to have a signal reproduced by the head at a maximum signal level; detecting means for detecting the excited state of the stepper motor after completion of the head positioning action of the motor; and power supply state control means for controlling a power supply to the stepper motor according to the result of detection made by the detecting means.

It is another object of the invention to provide a recording or reproducing apparatus wherein head tracking means for setting a head in an optimum position relative to concentric or helical recording tracks on a disc-shaped recording medium is arranged in a simplified manner to consume a reduced amount of electric energy.

It is a further object of the invention to provide a head positioning device which uses a stepper motor and is arranged to detect the state of the exciting phase of the motor and to enhance the efficiency of electric energy consumption without degrading the performance of the device.

These and other objects and features of the invention will become apparent from the following detailed description of embodiments thereof taken in connection with the accompanying drawings.

BRIEF DESCRIPTION OF THE DRAWINGS

All the accompanying drawings show the embodiments of this invention.

DETAILED DESCRIPTION OF THE PREFERRED EMBODIMENTS

In the case of a recording or reproducing apparatus described in detail below as an embodiment of this invention with reference to the accompanying drawings, the invention is applied to an electronic still video camera which is arranged to record video and audio signals and data on a magnetic disc.

Figure 1:
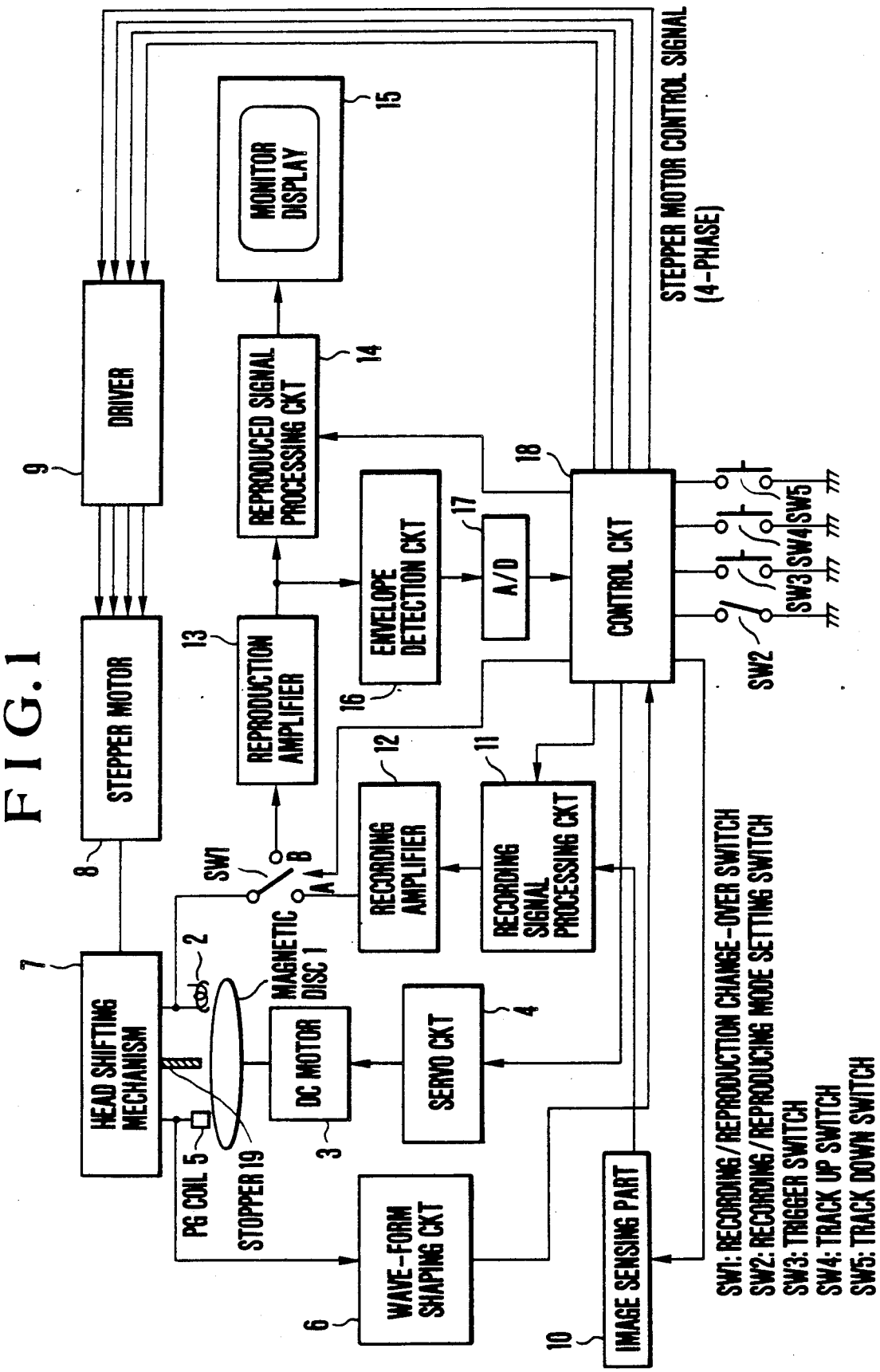
FIG. 1 is a block diagram showing a recording or reproducing apparatus arranged as an embodiment of the invention.

FIG. 1 is a block diagram showing the recording or reproducing apparatus arranged as an embodiment of this invention. Referring to FIG. 1, a magnetic disc 1 is employed as a recording medium. A magnetic head 2 is arranged to record or reproduce signals and data on or from the magnetic disc 1. A magnetic disc rotating DC motor 3 is arranged to rotate the magnetic disc 1. A motor servo circuit 4 is arranged to cause the DC motor 3 to rotate at a given constant speed. A phase detecting coil 5 (hereinafter referred to as a PG coil) is arranged to detect the rotation phase of the magnetic disc 1 by detecting a magnetized piece (not shown) which is disposed at a part of the magnetic disc 1. A wave-form shaping circuit 6 is arranged to shape the wave-form of a pulse signal which corresponds to the rotation phase of the disc 1 detected by the PG coil 5. A head shifting mechanism 7 is arranged to move the magnetic head 2 radially inward or outward over the magnetic disc 1. A stopper 19 is arranged to limit the inward movable extent of the head. A stepper motor 8 is arranged to drive the head shifting mechanism 7 to move the head 2 to each of recording tracks on the magnetic disc 1. A driver 9 is arranged to control the stepper motor 8.

An image sensing part 10 includes an image sensor such as CCD or the like which is arranged to convert into an electrical signal an image formed through a photo-taking lens. A recording signal processing circuit 11 is arranged to process the signal output from the image sensing part 10 including an emphasizing process, frequency modulation, etc., for converting it into a signal form suited for recording on the magnetic disc 1. A recording amplifier 12 is arranged to amplify the recording signal output from the recording signal processing circuit 11 and to supply the amplified recording signal via a recording/reproduction change-over switch SW1 to the magnetic head 2. The image obtained at the image sensing part 10 is thus converted into the electrical signal. The signal is subjected to a predetermined processes at the signal processing circuit 11. The signal is then supplied via the recording amplifier 12 to the magnetic head 2 to be recorded in concentric circular tracks on the magnetic disc 1.

A reproduction amplifier 13 is arranged to amplify to a given level a signal reproduced from the magnetic disc 1 by the magnetic head 2. A reproduced signal processing circuit 14 is arranged to process the reproduced signal output from the reproduction amplifier 13 in a manner reverse to the signal processing operation performed in recording. In other words, the circuit 14 converts the reproduced signal into the original signal through frequency demodulation and de-emphasis processes, etc. A monitor display device 15 is arranged to receive the reproduced signal from the circuit 14 to display a video picture.

An envelope detection circuit 16 is arranged to detect the envelope of the reproduced signal obtained through the reproduction amplifier 13 and to output a signal level. An A/D converter 17 is arranged to convert the signal level output from the envelope detection circuit 16 into a digital signal. A control circuit 18 is arranged to control the whole system of the apparatus. The control circuit 18 is composed of a CPU; a ROM having a control program stored therein; a RAM for storing data of varied kinds during a control operation; and input and output interfaces for elements to be controlled. The control circuit 18 is thus arranged to receive the rotation phase signal output from the wave-form shaping circuit 6 indicating the rotation phase of the magnetic disc 1; information on the reproduced signal level output from the A/D converter 17; and data of varied kinds about the operating positions of various operation switches which will be described later. After receipt of these inputs, the control circuit 18 controls the whole apparatus including the image sensing part 10; the motor servo circuit 4, the recording/reproduction change-over switch SW1; the recording signal processing circuit 11; the reproduced signal processing circuit 14; and the driver 9 which is arranged to drive the head shifting stepper motor 8.

To the control circuit 18 are connected operation switches SW2 to SW5. The switch SW2 is a mode setting switch provided for selectively setting the apparatus either in a recording mode or in a reproducing mode. The switch SW2 is of a lock type and is arranged to be turned on when the recording mode is selected and to be turned off when the reproducing mode is selected. The switch SW3 of the non-lock type serves to trigger a sequence of recording actions when the apparatus is set in the recording mode and to trigger a sequence of reproducing actions when the apparatus is set in the reproducing mode. The switch SW4 is provided for changing a recording track or a reproducing record track on the magnetic disc 1 to another track. Every time the switch SW4 is turned on, the position of the magnetic head 2 on the magnetic disc 1 is shifted inward, i.e., from one track to another track having a larger track number assigned thereto. Hereinafter, the action to move the head in this direction will be called a track up action and the switch SW4 will be referred to as a track up switch. The switch SW5 is also arranged to change a recording track or a reproducing record track to a next track. Contrary to the switch SW4, when the switch SW5 is turned on, the position of the magnetic head 2 is shifted outward from one track to another track of a smaller track number. Hereinafter, the head moving action in that direction will be called a track down action and the switch SW5 will be referred to as a track down switch. Both the switches SW4 and SW5 are of the non-lock type and are arranged to be turned on only when they are operated.

Figure 4:
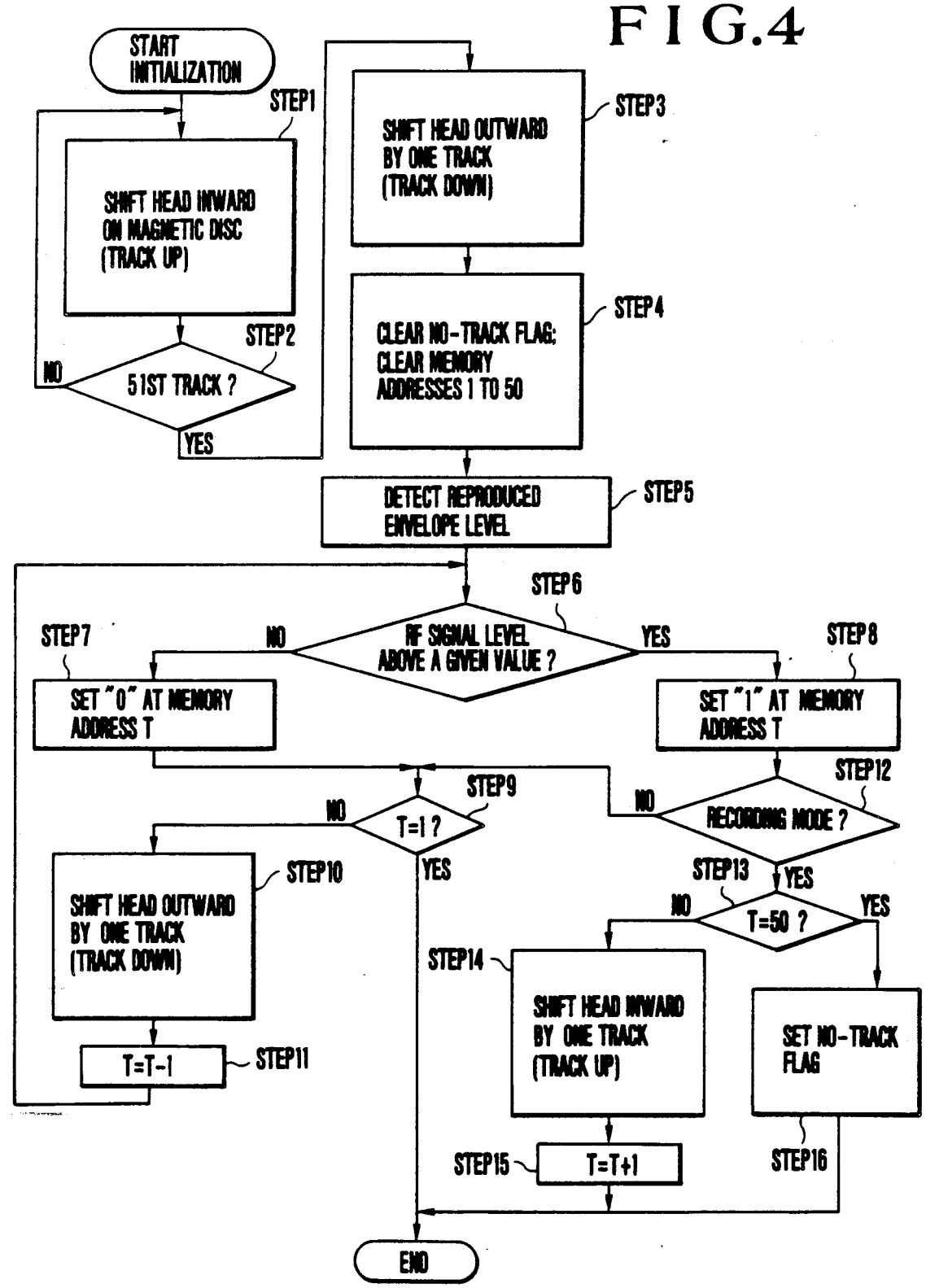
FIG. 4 is a flow chart showing the initializing action of the embodiment.

The embodiment is characterized in the arrangement of a magnetic head moving control system. The control operation of the embodiment is described with reference to FIGS. 2 to 5 with emphasis placed on the head moving control system as follows:

With the magnetic disc 1 loaded on the apparatus by known means, when a power supply switch which is not shown is closed, an initial setting action (initialization) is performed in accordance with a program stored in the control circuit 18. FIG. 4 is a flow chart showing this initial setting action. Further, a recording format employed by the electronic still video camera of this embodiment is as follows: A total of 50 recording tracks are concentrically formed and evenly spaced on the magnetic disc 1. Each of the tracks measures 60 μm in width and has a guard band of width 40 μm provided between adjacent tracks. Track numbers are consecutively assigned to these tracks in such a manner that a 50th track is located in the innermost position and a first track in the outermost position on the magnetic disc 1.

The head shifting stepper motor 8 has four exciting phases including a phase "a", a phase "b", a phase "c" and a phase "d". Every time the rotating shaft of the motor 8 makes one turn, the head shifting mechanism 7 shifts the position of the head 2 to an extent of 100 μm, which corresponds to one track.

Referring to FIG. 4, when the power supply switch is closed with the magnetic disc 1 loaded on the apparatus in a known manner, the control circuit 18 shifts the position of the recording/reproduction change-over switch SW1 to a contact B thereof which is disposed on the side of the reproduction amplifier 13. This connects the magnetic head 2 to the reproduction amplifier 13. Following this, the control circuit 18 controls the motor servo circuit 4 to cause the motor 3 to rotate. The magnetic disc 1 is then rotated at a given constant speed.

Figure 3:
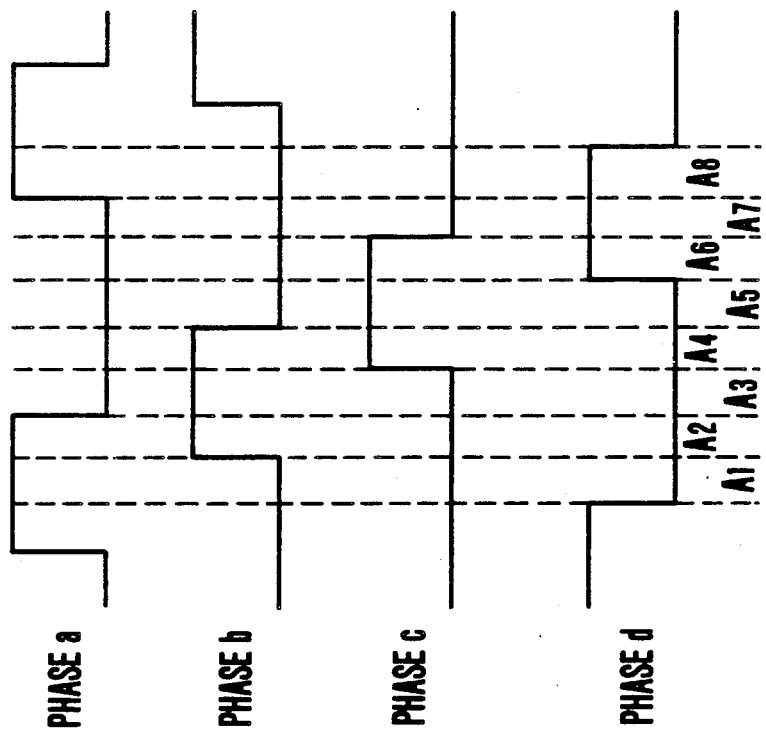
FIG. 3 shows an excitation pattern of each phase obtained by a 1 phase exciting method employed for the stepper motor.

Steps 1 and 2: Under this condition, the control circuit 18 controls the driver 9 to drive the stepper motor 8. The motor 8 in turn causes the magnetic head 2 to be moved inward to an extent corresponding to 51 tracks (in the track up direction or the track number increasing direction). This brings the head to a point which is located one track distance away from the innermost track on the inner side of the track. FIG. 3 shows the driving wave forms of the exciting phases "a", "b", "c" and "d" of the stepper motor 8. These exciting phases "a", "b", "c" and "d" are serially excited in sequence of B1 - B2 - B3 - B4 - B5 as shown in FIG. 3. The magnetic head 2 can be shifted to an extent of one track in this manner. At the steps 1 and 2, this sequence is repeated 51 times.

The magnetic head 2 eventually comes to a stop, abutting on the stopper 19 shown in FIG. 1. The stopper 19 is disposed in a position corresponding to a 51st track position on the magnetic disc 1. At a step 3: From the 51st track position, the magnetic head is shifted outward to the extent of one track (in the track down direction). The head thus comes to the 50th track. At this time, the exciting phase "a" of the stepper motor 8 is excited. The track No. 50 is set at a register which is arranged to indicate track numbers T set within the RAM of the control circuit 18. The flow of the control operation then proceeds to a step 4.

At the step 4: A no-track flag which is provided within the RAM of the control circuit 18 as will be described later is cleared. At the same time, the resist addresses 1 to 50 corresponding to the track numbers T provided within the RAM are also cleared. The flow then proceeds to a step 5. At the step 5: The envelope level of an RF signal reproduced from a track on the magnetic disc 1 is detected. At a step 6: A check is made for the presence or absence of an RF signal recorded.

In other words, an RF signal which is reproduced by the magnetic head 2 through the switch SW1 of FIG. 1 is amplified by the reproduction amplifier 13 and, after that, is subjected to the detecting action of the envelope detection circuit 16. A signal level thus detected by the envelope detection circuit 16 is converted into a digital signal by the A/D converter 17. The digital signal is supplied to the control circuit 18. The control circuit 18 then compares the digital signal output from the A/D converter 17 with a preset reproduction level value of an unrecorded track. The result of comparison enables the control circuit 18 to find the presence or absence of recorded information, or an RF signal, at the steps 5 and 6.

When no RF signal is determined to be present at the step 6, the flow proceeds to a step 7. At the step 7: Data "0" which indicates a vacant track is set at an applicable address of the register of the RAM which is arranged to indicate track numbers T. The flow then comes to a step 9. At the step 9: A check is made to find if the track number T is "1" which means the outermost track. If not, the flow proceeds to a step 10. At the step 10: The magnetic head 2 is moved to the extent of one track outward, i.e., in the track down direction. At a step 11: A value "1" is subtracted from the track number T. The flow then comes back to the step 6 to repeat the above-stated steps. If the presence of an RF signal is detected at the step 6, the flow comes to a step 8. At the step 8: Data "1" which indicates a recorded track is set at the address corresponding to the track number T of the RAM of the control circuit 18. The flow then comes to a step 12.

Step 12: A check is made for the state of the switch SW2 to find whether the apparatus is in the recording mode. If the switch SW2 indicates the recording mode, the flow proceeds to a step 13. If the switch indicates the reproduction mode, the flow comes to the step 9. At the step 13: A check is made to see if the track at which the magnetic head 2 is currently located is the track No. 50, i.e., the innermost track. If so, the no track flag which indicates that there is no vacant track is set and the flow comes to an end. Further, if the track is found to be not the track No. 50 at the step 13, the flow proceeds to a step 14. At the step 14: The head is moved one track inward. The flow comes to a step 15. At the step 15: A value "1" is added to the track number T (track up) and the flow comes to an end.

Further, if the apparatus is found to be in the reproduction mode at the step 12, the flow comes to the step 9. At the step 9, the track number T is checked for the track No. 1. If it is found to be the track No. 1, the flow comes to an end. If not, the flow proceeds to the step 10 to repeat the above-stated steps.

As described above, in a case where the apparatus is in the recording mode, if the 50th track has already been recorded, the magnetic head 2 is positioned at the 50th track in the initial setting process. If not, the magnetic head 2 is positioned at a vacant (unrecorded) track which is located immediately adjacent to a recorded track on the inner side of the latter. As apparent from the flow chart, if all the tracks from the fiftieth to the first track are vacant tracks, the head 2 is set at the first track.

In the case of the reproducing mode, information on recorded and unrecorded tracks covering all the tracks from the 50th to the first tracks are taken into the RAM of the control circuit 18. Upon completion of the initial setting process, the magnetic head 2 is set at the first track in this case.

Recording or reproduction is performed after completion of the initial setting. The recording operation is first described as follows:

With the apparatus set in the recording mode, the magnetic head 2 is positioned at a vacant track if the no-track flag is not set, as mentioned in the foregoing description of the flow chart of FIG. 4. The recording operation is allowed only when the no-track flag is not set. When the trigger switch SW3 of FIG. 1 is turned on with the no-track flag not set, the control circuit 18 controls the image sensing part 10. The image sensing part 10 then converts into an electrical signal an image formed on its image sensing plane by a lens which is not shown. The electrical image signal read out from the image sensing part (CCD) is supplied to the recording signal processing circuit 11. The signal is then converted into a signal form suited for recording on the magnetic disc 1 through a preemphasis process, a frequency modulation process, etc. The output of the signal processing circuit 11 is supplied to the recording amplifier 12. A recording signal thus obtained is supplied to the magnetic head 2 via the switch SW1 which is arranged to be operated by the control circuit 18. The head 2 then records the signal in a recording track on the magnetic disc 1.

After that, the control circuit 18 shifts the position of the switch SW1 to its contact B to control the driver 9. This causes the driver 9 to drive the stepper motor 8. The magnetic head 2 is moved inward (track up direction) to the extent of one track. After the one track shift of the magnetic head 2, the control circuit 18 checks the reproduced RF signal level converted into a digital signal by the A/D converter 17 to see if the current track is a vacant track. Further, with "1" added to the track number T at that time, if the track number becomes 51, the above-stated no-track flag is set. As mentioned above, recording is then performed with the trigger switch SW3 turned on until the no-track flag is set.

Further, when the track feeding action comes to an end, the exciting phase of the stepper motor corresponds to the phase "a" of FIG. 3. If the trigger switch SW3 is not turned on after completion of the one-track feeding action, the control circuit 18 causes the power supply for the phase "a" to be turned off. The power supply for the phase "a" is turned off irrespective of the position of the switch SW3 when the magnetic head 2 is moved to the 51st track.

Next, the operation of the apparatus in the reproducing mode is as follows: With the apparatus in the reproducing mode, if the magnetic head 2 is currently located at a recorded track, the head 2 is shifted, under the so-called automatic tracking action, to a position where the recorded RF signal is reproduced at a maximum level. In the reproducing mode, the head 2 is shifted in units of tracks by the operation of the switches SW4 and SW5. In this event, the stepper motor 8 is driven in the 1 phase exciting method. When being stopped in the 2 phase exciting method, the stepper motor 8 is driven by one step in the 1-2 phase exciting method and, after that, is driven in the 1 phase exciting method. The automatic tracking control operation of the embodiment is as shown in a flow chart in FIG. 5.

Figure 2:
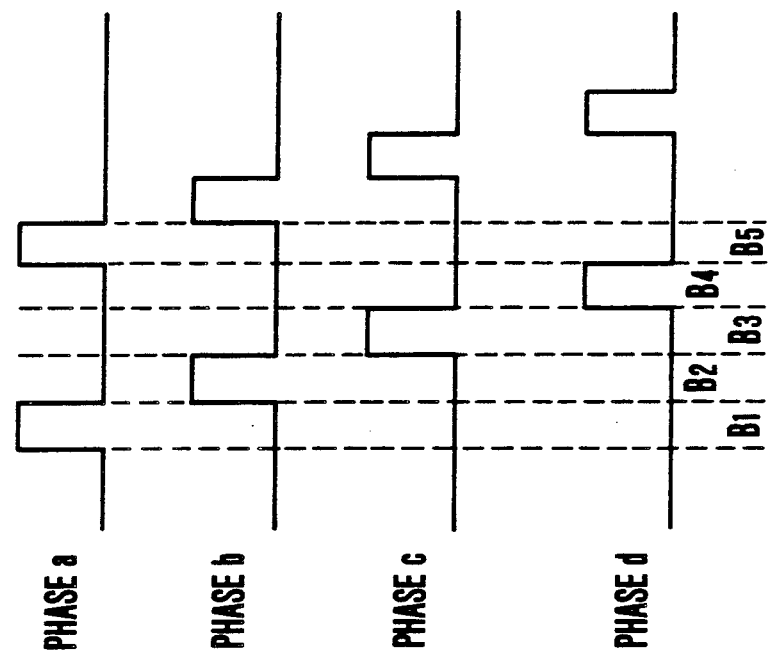
FIG. 2 shows an excitation pattern of each phase obtained by a 1-2 phase exciting method employed for a stepper motor.

In this instance, unlike the 1 phase excitation which is performed in the recording mode or in the initial setting process, the stepper motor 8 is controlled by a 1-2 phase exciting method. In the 1 phase exciting method, the magnetic head 2 is moved stepwise to the extent of 25 $\mu$m at each step to cover one track distance of 100 $\mu$m by four steps. Whereas, in the case of the 1-2 phase exciting control, the magnetic head is moved 12.5 $\mu$m at each step. The pattern of excitation for the phases "a", "b", "c" and "d" of the stepper motor 8 obtained in this case is as shown in FIG. 2. Referring to FIG. 2, when the exciting phase is changed in the sequence of A1 - A2 - A3 ---- A8, the magnetic head 2 is moved outward on the magnetic disc 1 to the extent of 12.5 $\mu$m per step. When the exciting phase sequence is changed over to a sequence of A8 - A7 - A6 ---- A1, the magnetic head 2 is moved inward on the magnetic disc 1 to the extent of 12.5 $\mu$m at each step.

Referring to the flow chart of FIG. 5, the automatic tracking operation is described as follows:

Step 17: A check is made for the content of the memory at an address indicating the track number T of a track currently accessed by the magnetic head 2 on the magnetic disc 1 to see if it is the data "1". If the content is the data "1" thus indicating a recorded track, the flow proceeds to a step 18. If not, the currently accessed track is considered to be a vacant track and the flow comes to a step 33. At the step 18: A reproduced RF signal is supplied from the magnetic head 2 to the reproduction amplifier 13 via the switch SW1 to be amplified there. The amplified RF signal is supplied to the envelope detection circuit 16 to be subjected to the detecting action of the circuit 16. The detection output signal of the circuit 16 is converted into a digital value by the A/D converter 17. The digital value is supplied to the control circuit 18 to be stored at a register n(0) disposed within the control circuit 18. The flow proceeds to a step 19. At the step 19: The magnetic head 2 is moved one step outward by the 1-2 phase exciting method described in the foregoing.

The flow proceeds to a step 20. At the step 20: The envelope level value of the reproduced RF signal is read out and stored at the register n(−1) of the control circuit 18 in the same manner as at the step 18.

The flow proceeds to a step 21. At the step 21: The stored values n(0) and n(−1) are compared. If the value n(0) is not larger than the value n(−1), the flow comes to a step 28 to store the value n(−1) at the register n(0). The flow then comes to a step 29. At the step 29: The magnetic head 2 is moved one step outward by the 1-2 phase exciting method. At a step 30: The envelope level of the reproduced RF signal is read out and stored at the register n(−1) like at the step 18. At a step 31: The values n(0) and the n(−1) are compared with each other. If the value n(0) is not larger than the value n(−1), the flow branches to the step 28 to repeat the above-stated steps.

When the value n(0) is found to be larger than the value n(−1) at the step 31, the flow proceeds to a step 32. At the step 32: The magnetic head 2 is moved one step inward by the 1-2 phase exciting method. The flow then proceeds to a step 33.

If the value n(0) is found to be larger than the value n(−1) at the step 21, the flow proceeds to a step 22. At the step 22: The magnetic head 2 is moved two steps inward by the 1-2 phase exciting method. Incidentally, since the two phases "a" and "b" are excited at this time, such a movement is equivalent to moving the head 2 inward by one step in the 2 phase exciting method. Thus, the phases "a" and "b" may be excited. Following that, the flow comes to a step 23. At the step 23: The envelope level of the reproduced RF signal is supplied to the control circuit 18 in the same manner as described above. The control circuit 18 reads the level value and stores it at a register n(1).

At a step 24: The value n(0) is compared with the value n(1) to see if it is larger than the latter. If the value n(0) is found to be larger than the latter, the flow proceeds to a step 25. At the step 25: The magnetic head 2 is moved one step outward by the 1-2 phase exciting method. The flow then comes to a step 33. If the value n(0) is found to be not larger than the value n(1) at the step 24, the flow comes to a step 26. At the step 26: The value n(1) is stored at the register n(0). The flow then proceeds to a step 27. At the step 27: The magnetic head 2 is moved one step inward by the 1-2 phase exciting method. After that, the flow comes to the step 23 to repeat the above-stated steps.

When the flow proceeds to the step 33 from the steps 17, 25 and 32 as mentioned above, the exciting phase of the stepper motor 8 is checked to find if it is only one phase. If so, the flow proceeds to a step 34 to come to an end after turning the power supply off. If not, the flow comes directly to an end without turning the power supply off.

Figure 5:
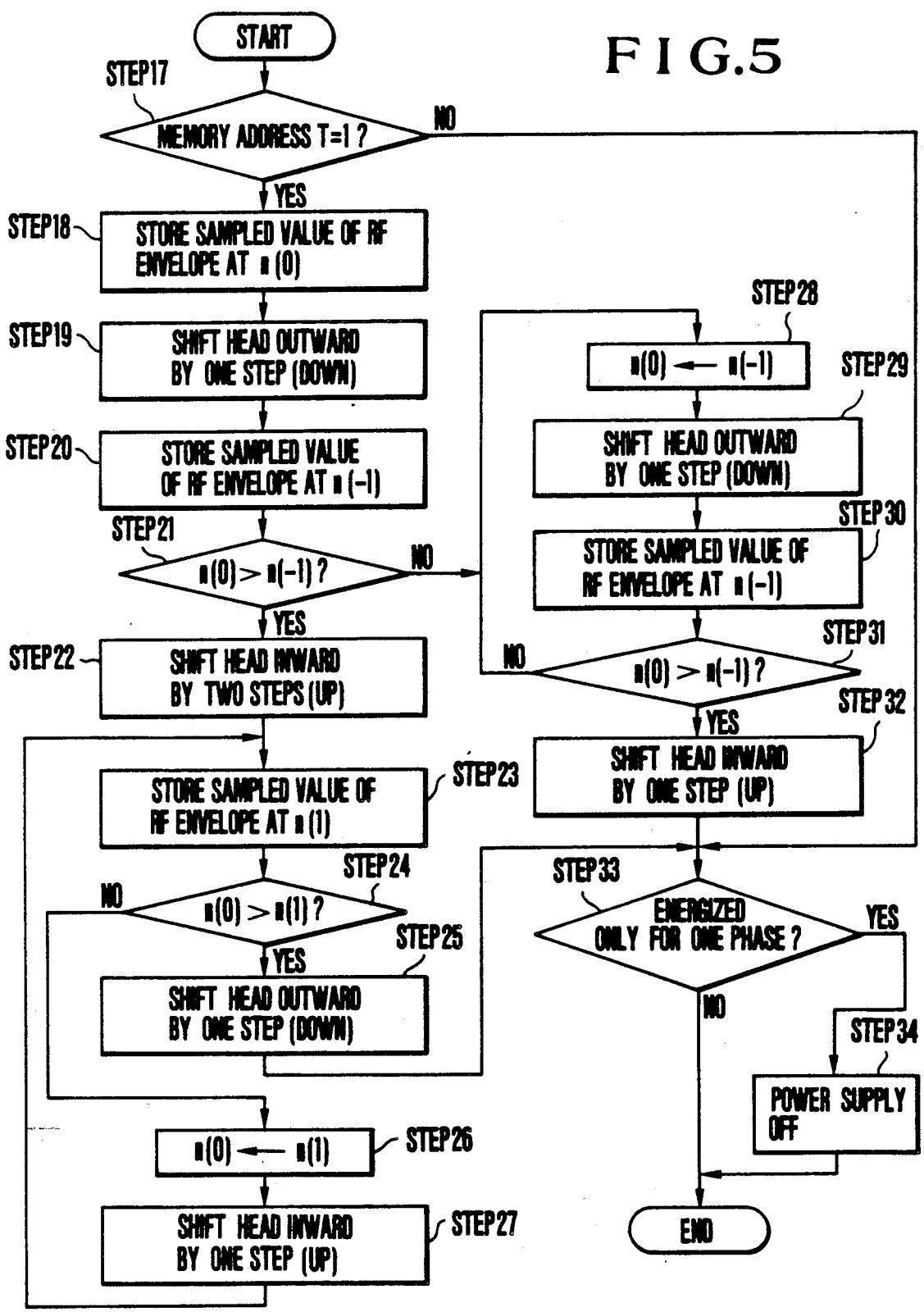
FIG. 5 is a flow chart showing the automatic tracking action to be performed for reproduction by the same embodiment.

In a case where the track accessed at the step 18 or at the start point of time in the flow shown in FIG. 5 is a recorded track, the magnetic head 2 is positioned at a point where the RF signal is reproducible at a maximum level thereof by the time when the flow comes to the step 33 as mentioned in the foregoing.

After completion of the automatic tracking operation with the flow coming to the step 33, the control circuit 18 detects the phase of the stepper motor 8 excited by the driver 9. If the magnetic head 2 is in repose with the motor 8 in the position of 1 phase excitation, the control circuit 18 brings the power supply for the exciting phase to an end. If the magnetic head 2 is in repose with the motor in the position of 2 phase excitation, the control circuit 18 allows the power supply to continue.

In other words, in a case where the stepper motor 8 is in the 1 phase exciting state, the exciting coil of the stepper motor 8 is in a stable relation to the shaft of the motor. Therefore, the motor 8 can be retained in a position which is obtained before the power supply when the power supply is turned off with the motor 8 in that state. Whereas, if the power supply is turned off when the stepper motor 8 is in the 2 phase exciting state, the stepper motor 8 cannot be kept in its position obtained before the power supply and then the motor comes to shift the position of the magnetic head 2. Hence, the power supply is allowed to continue in the case of 2 phase excitation.

Figure 6A:
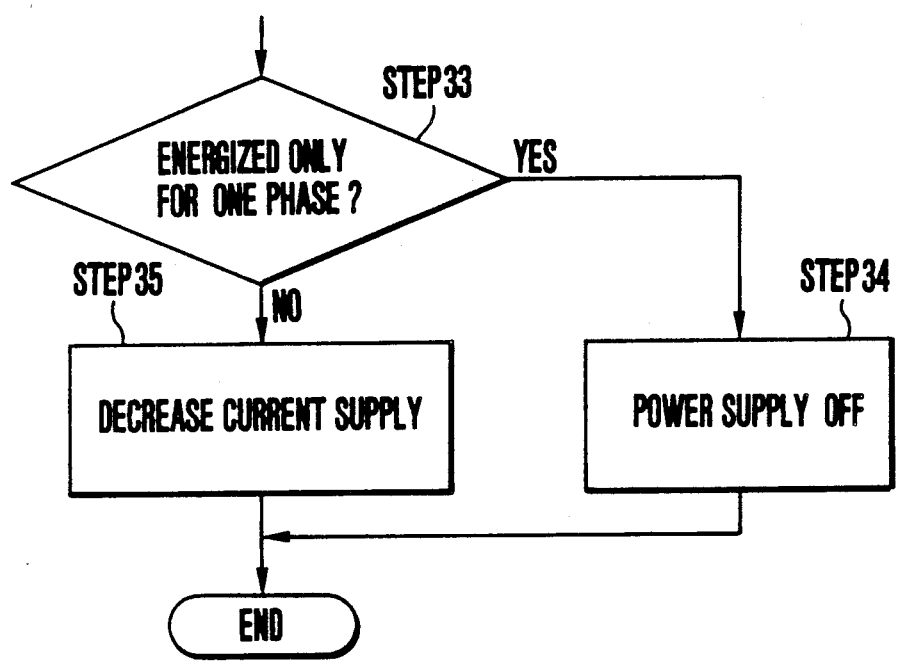
FIGS. 6(a) and 6(b) are flow charts showing the automatic tracking actions performed by other embodiments for reproduction.

In the embodiment described, when the stepper motor is found to be excited not only for one phase at the step 33 of the flow chart of FIG. 5, i.e., in the event of 2 phase excitation, both the phases are having the power supply. For further saving the electric energy, therefore, the control arrangement of the embodiment described may be changed to lessen the current supply to the stepper motor by providing an additional step 35 after the step 33 in a manner as shown in FIG. 6(a). The step 35 can be executed with the driver 9 controlled by the control circuit 18 in such a way as to change a voltage to be applied to each phase of the stepper motor 8 to another voltage.

Figure 6B:
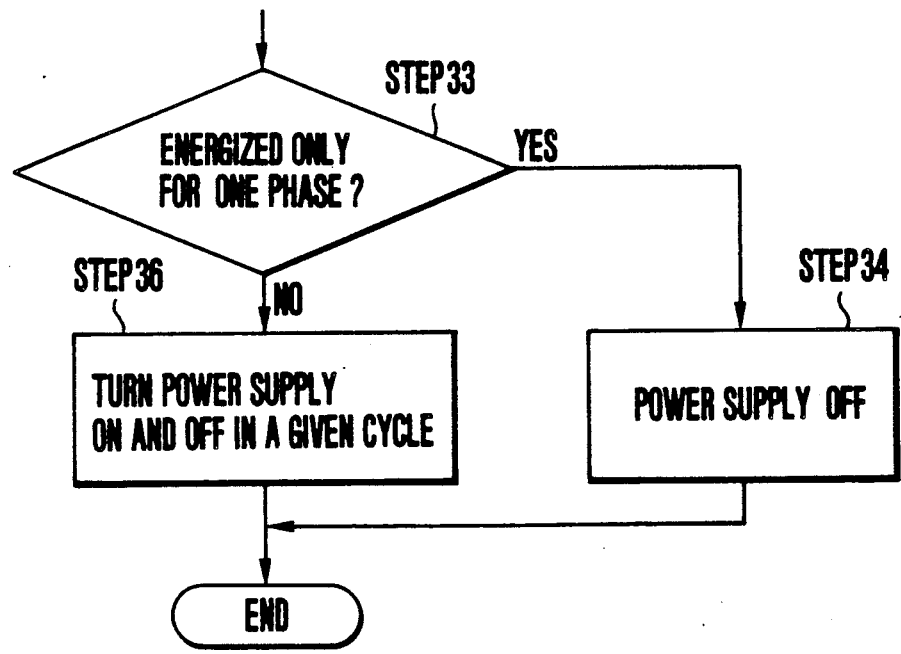

Further, FIG. 6(b) shows another example of modification of the embodiment in this respect. According to the arrangement of this modification, an additional step 36 is provided after the step 33. In the case of the 2 phase excitation, the control circuit 18 causes the power supply to the stepper motor 8 repeatedly turned on and off in a given cycle in such a manner as to keep the position of the magnetic head 2 unvarying.

The recording or reproducing apparatus according to this invention is arranged, as described in the foregoing, to detect the exciting (or energized) phase of the stepper motor after completion of the automatic tracking operation; and to change the exciting method according to whether the stepper motor is having a power supply only for one phase thereof or for two phases thereof. The arrangement enables the apparatus to reduce its electric energy consumption while the rotating position of the stepper motor is kept unvarying. In the case of an electronic camera of the kind permitting use of a battery, therefore, the limited service life of the battery can be extended. This is a great advantage of the invention.

What is claimed is:

1. A recording or reproducing apparatus arranged to perform recording or reproduction by allowing a head to gain access to a recording track formed on a recording medium, comprising:
   a) head driving motor for driving said head;
   b) tracking means for controlling said head driving motor in such a way as to bring said head to a position where a signal is reproduced from the track at a maximum level;
   c) determining means for determining an excited state of said head driving motor after completion of a tracking action of said tracking means; and
   d) control means for controlling a power supply to said head driving motor to maintain the driving position of said head according to the result of determination made by said determining means.

2. An apparatus according to claim 1, wherein said recording medium is a disc-shaped recording medium which is arranged to be driven and rotated at a predetermined speed, and wherein said recording track is one of a plurality of concentric circular tracks formed on said recording medium.

3. An apparatus according to claim 1, wherein said tracking means is arranged to detect an envelope level of a signal reproduced from said recording medium by said head and to move said head to a position where the detected envelope level is at a maximum value.

4. An apparatus according to claim 1, wherein said head driving motor includes a stepper motor for driving said head, and wherein said head is shifted at a predetermined interval by driving said stepper motor stepwise according to predetermined unit steps.

5. An apparatus according to claim 4, wherein said head driving stepper motor is a 4-phase stepper motor, wherein said stepper motor is arranged to be capable of being driven in a plurality of exciting modes which have different exciting patterns for each phase of said stepper motor, and wherein each of said exciting modes is switched over to another according to an operation mode of said apparatus.

6. An apparatus according to claim 5, wherein said stepper motor is arranged to be driven in a 1 phase excitation when said apparatus is in an initial setting mode and a recording mode and said stepper motor is arranged to be driven in a 1-2 phase excitation when said apparatus is in a reproducing mode requiring the tracking action.

7. An apparatus according to claim 6, wherein said determining means is arranged to determine an excited state in each phase of said stepper motor after completion of the tracking action on said head.

8. An apparatus according to claim 7, wherein said control means is arranged to turn off the power supply to said stepper motor, on the basis of the result of determination made by said determining means, if said stepper motor has one phase thereof excited and to allow the power supply to continue if said stepper motor has two phases thereof excited.

9. An apparatus according to claim 7, wherein said control means is arranged to turn off the power supply to said stepper motor, on the basis of the result of determination made by said determining means, if said stepper motor has one phase thereof excited and to allow the power supply to continue in a reduced amount if said stepper motor has two phases thereof excited.

10. An apparatus according to claim 9, wherein said control means is arranged to turn off the power supply to said stepper motor, on the basis of the result of determination made by said determining means, if said stepper motor has one phase thereof excited and to allow the power supply to be intermittently effected in a reduced amount for exciting phases of said stepper motor if said stepper motor has two phases thereof excited.

11. An apparatus according to claim 1, wherein said recording medium is a magnetic recording medium, and wherein said head is a magnetic head.

12. A motor control device for positioning a movable body by shifting said movable body to a desired position, comprising:
   a) a motor arranged to drive said movable body to move to said desired position;
   b) first control means for controlling said motor in such a way as to minimize the degree of deviation of the position of said movable body from said desired position; and
   c) second control means arranged to control a power supply to said motor to maintain the position where said movable body is stopped according to an excited state of said motor after completion of a positioning action of said motor performed for moving said movable body to said desired position.

13. A device according to claim 12, wherein said desired position is a recording area on a recording medium, and wherein said movable body is a recording or reproducing head which is arranged to perform recording or reproduction in or from said recording area.

14. A device according to claim 13, wherein said first control means is arranged to perform a tracking control action for positioning said head relative to said recording area in a position where the level of a signal reproduced by said head becomes a maximum level.

15. A device according to claim 12, wherein said motor is a stepper motor.

16. A device according to claim 15, wherein said second control means is arranged to control the state of a power supply for each phase of said stepper motor according to an excited state of each phase of said stepper motor obtained when said movable body is brought to a stop.

17. A device according to claim 16, wherein said stepper motor is driven in a 1-2 phase excitation, and wherein said second control means is arranged to control the power supply to said stepper motor in such a manner that, when said movable body is brought to a stop, the power supply is turned off if said stepper motor has each phase thereof singly excited and to allow the power supply to continue if two phases of said stepper motor are excited.

18. A device according to claim 17, wherein said second control means is arranged to control the power supply to said stepper motor in such a manner that, when said movable body is brought to a stop, the power supply is turned off if said stepper motor has each phase thereof singly excited and to allow the power supply to continue while reducing the amount of the power supply if two phases of said stepper motor are excited.

19. A device according to claim 18, wherein said second control means is arranged such that, when reducing the power supply to said stepper motor, the amount of the power supply is reduced by intermittently turning the power supply on and off in a predetermined cycle.

20. A tracking device for positioning a head relative to a recording track formed on a recording medium, comprising:
   a) a stepper motor arranged to drive and move said head;
   b) motor control means for controlling said stepper motor to position said head relative to said recording track in such a way as to have a signal reproduced by said head at a maximum signal level;
   c) detecting means for detecting an excited state of said stepper motor after completion of a head positioning action of said motor; and
   d) power supply control means for controlling a power supply to said stepper motor to maintain the rotating position of said stepping motor according to the result of detection made by said detecting means.

21. A device according to claim 20, wherein said recording medium is a disc-shaped magnetic recording medium which is arranged to be driven to rotate at a predetermined speed, wherein said recording track is one of a plurality of concentric circular tracks formed on said recording medium, and wherein said head is a magnetic head.

22. A device according to claim 20, wherein said motor control means is arranged to detect an envelope level of a signal reproduced by said head from said recording medium and to drive said stepper motor to perform a tracking action for shifting said head to a position where the detected envelope level is at a maximum level.

23. A device according to claim 20, wherein said head driving stepper motor is a 4-phase stepper motor, and wherein said motor control means is arranged to be capable of driving said stepper motor in a plurality of exciting modes which have different exciting patterns for each phase of said stepper motor and to select one of said exciting modes according to an operation mode of said device.

24. A device according to claim 23, wherein said motor control means is arranged to drive said stepper motor in a 1 phase excitation when said device is in an initial setting mode and a recording mode and to drive said stepper motor in a 1-2 phase excitation when said device is in a reproducing mode requiring the tracking action on said head.

25. A device according to claim 24, wherein said detecting means is arranged to detect an excited state in each phase of said stepper motor obtained after completion of the tracking action on said head.

26. A device according to claim 25, wherein said power supply control means is arranged to control the power supply on the basis of the result of detection made by said detecting means in such a way as to turn off the power supply if said stepper motor is excited in one phase thereof and to allow the power supply to continue for exciting phases if said motor is excited in two phases thereof.

27. A device according to claim 26, wherein said power supply control means is arranged to control said stepper motor on the basis of the result of detection made by said detecting means, so that the power supply is turned off if said stepper motor is excited for one phase thereof and the power supply is allowed to continue in a reduced amount for exciting phases if said stepper motor is excited for two phases thereof.

28. A device according to claim 27, wherein said power supply control means is arranged to control said stepper motor on the basis of the result of detection made by said detecting means so that the amount of the power supply is reduced by intermittently effecting the power supply for exciting phases if said stepper motor is excited for two phases thereof.

29. A recording or reproducing apparatus, comprising:

a) head means for recording on or reproducing from a recording medium;
b) a stepper motor arranged to drive said head means;
c) discriminating means for discriminating excited state of driving coils of said stepper motor in a state wherein said head means is stopped; and
d) control means for controlling power supply to said driving coils of said stepper motor to maintain the stopped position of said head means according to the result of discrimination effected by said discriminating means.

30. An apparatus according to claim 29, wherein said control means is arranged to shut off power supply to said driving coil when it is discriminated by said discriminating means that the excited state of the driving coils of said stepper motor is in 1 phase exciting state.

31. An apparatus according to claim 30, wherein said control means is arranged to maintain the power supply in a case where the power is supplied to a plurality of driving coils in the excited state of the driving coils of said stepper motor.

32. An apparatus according to claim 29, further comprising:

motor driving control means which is arranged to drive said stepper motor in respective different exciting methods at the time of recording and at the time of reproduction.

33. An apparatus according to claim 32, wherein said motor control means is arranged to drive said stepper motor in 1 phase exciting method at the time of recording and 1-2 phase exciting method at the time of reproduction.

34. An apparatus according to claim 29, wherein said stepper motor is a four-phase exciting stepper motor.

* * * * *